Sept. 6, 1966 D. H. RUMBLE ETAL 3,271,742
DEMODULATION SYSTEM
Filed Nov. 6, 1963 3 Sheets-Sheet 1

INVENTORS
DALE H. RUMBLE
HANS R. ULANDER
BY John J. Goodwin
ATTORNEY

Sept. 6, 1966 D. H. RUMBLE ETAL 3,271,742
DEMODULATION SYSTEM
Filed Nov. 6, 1963 3 Sheets-Sheet 3

United States Patent Office 3,271,742

Patented Sept. 6, 1966

3,271,742

DEMODULATION SYSTEM

Dale H. Rumble, Saugerties, and Hans R. Ulander, Woodstock, N.Y., assignors to International Business Machines Corporation, New York, N.Y., a corporation of New York Filed Nov. 6, 1963, Ser. No. 321,797
12 Claims. (Cl. 340—167)

The present invention relates to the detection of digital signals and more particularly to the demodulation of what is referred to as bi-phase signals of the type composed of positive and negative excursions from a datum.

Bi-phase binary signals are a form of coding binary information wherein one binary value is represented by a waveform having alternate positive and negative excursions from a datum and the other binary value is represented by a similar waveform but of opposite polarity.

The transmission of bi-phase signals includes the advantage of the elimination of an average direct current level so that more accurate detection of the signal is possible than with signals having a direct current level.

An important consideration in the detection of transmitted signals including bi-phase signals is the presence of noise. In some instances noise results in erroneous demodulation. One prior art method of recovering signal from noise is by correlation wherein the received signal is multiplied at the receiver by a "1" bit signal and a "0" bit signal. The maximum product of the two multiplications indicates the identity of the signal. To further enhance this technique when the noise level is prohibitive, the incoming signal is integrated so that the multiplication occurs over an expanded time period. The length of the period of integration is adjusted in accordance with the extent of the noise level. The multiplication, occurring over a greater time period, produces a more definitive result.

In a co-pending application, Serial No. 228,961, of Dale H. Rumble, filed October 8, 1962, now Patent No. 3,244,986 and assigned to the same assignee as the present invention, a detection system for bi-phase signals is described. The co-pending application represents an improvement over the prior art in that a correlation system is described wherein a waveform addition method is employed.

The co-pending application has for its principal purpose the detection of bi-phase signals without the requirement for any clock source at the receiver, but with an improvement in signal-to-noise ratio, especially in a gaussian noise environment. The system described in the co-pending application relates to bi-phase signals wherein the binary data is represented by single cycle waveforms and employs a threshold detection scheme which inhibits detection in the first half cycle of the received waveform, so that detection can only occur in the second half cycle. The inhibiting function is achieved through the generation of a degating voltage having a duration and form such that no excess of the received waveform over the threshold level is effective to provide a digit indication until after the waveform has decreased to a level below the threshold in the half waveform period following that in which an indication occurs.

More specifically, the co-pending application includes the provision of an indication of one digit whenever the correlation between the two half cycles of the single cycle waveform results in a total exceeding a threshold of one plurality, providing an indication of another digit whenever such correlation provides a total exceeding a threshold of another polarity, and inhibiting any such indication for a time interval between about ¾ of a waveform period and one waveform period after an indication occurs.

The system described in the co-pending application is directed to single cycle bit periods with the correlation occurring over the single cycle. Correlation over an expanded time period as accomplished by the integration method of the prior art is not a feature of the system in the co-pending application.

In the present invention an embodiment is described wherein correlation by addition for bi-phase signal detection may be accomplished over an expanded time period, with the time period being determined by the extent of the noise level.

An object of the present invention is to provide an improved demodulation system for bi-phase digital signals.

Another object of the present invention is to provide an improved demodulation system for bi-phase digital signals which occur asynchronously.

A further object of the present invention is to provide a demodulation system which operates with signals having low signal-to-noise ratios.

Another object of the present invention is to provide a demodulation system which employs correlation by waveform addition.

Still another object of the present invention is to provide a demodulation system which employs correlation by waveform addition and wherein the waveform length is determined by the signal-to-noise ratio.

The foregoing and other objects, features and advantages of the invention will be apparent from the following more particular description of a preferred embodiment of the invention, as illustrated in the accompanying drawings.

The invention will be described in conjunction with a binary digital system in which the binary values are represented by a plurality of sine waves wherein positive half cycles of sine wave, followed by negative half cycles, indicates a "1" while negative half cycles followed by positive half cycles indicates a "0." Nevertheless, the sine waveforms are not at all essential to the invention and in fact other known bi-phase waveforms, such as a skew-symmetric or pulse waveforms, may be employed.

Figure 1:
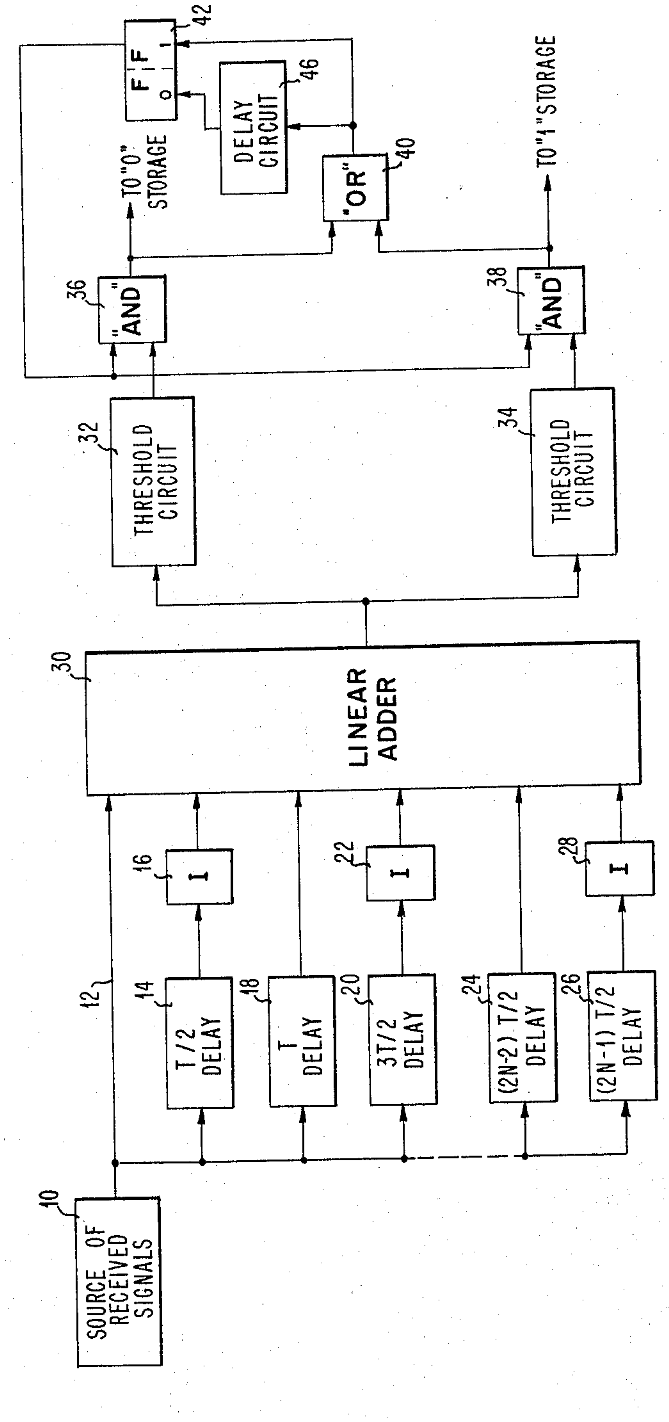
FIG. 1 is a block diagram of an embodiment of a demodulation system following the principles of the present invention.

Referring to FIG. 1, a demodulation system is shown including a source of received bi-phase signals 10. Source 10 represents the usual filters and amplifier stages which precede the demodulator stage in a typical receiver. The output of source of received signals 10 is coupled directly to a linear adder 30 via lead 12, and also through a half period delay circuit 14 and in inverter circuit 16; a full period delay circuit 18; a one-and-one-half period delay circuit 20 and inverter circuit 22; and through a similar progression of channels up to a $$(2N-2)\frac{T}{2}$$

delay circuit 24 and a $$(2N-1)\frac{T}{2}$$

delay circuit 26 and inverter circuit 28. The symbol T represents the period of a single sine wave cycle and N represents the number of sine wave cycles employed for each binary bit. The total number of channels coupled between source of received signals 10 and linear adder 30 is twice the number of cycles N employed to represent each binary bit. Thus, if two cycles per bit is employed, there would be four channels, with the fourth channel having a delay circuit with a delay equal to $$(2 \cdot 2-1)\frac{T}{2} \text{ or } \frac{3T}{2}$$

If three cycles of waveform per bit is employed, there would be six channels, with the sixth channel having a delay circuit with a delay equal to $$(2 \cdot 3-1)\frac{T}{2} \text{ or } \frac{5T}{2}$$

The general rule is that the number of channels coupled between source of received signals 10 and linear adder 30 is twice the number of waveform cycles N representing each binary bit; each channel includes a delay circuit wherein progressive channels have additional one half period delay, with the even numberel channels (second, fourth, sixth, etc.) channels including an inverter circuit. The outputs of each of the channels are connected to and combined within linear adder 30.

The output of linear adder 30 is connected to a positive threshold detector 32 and a negative detector 34, both threshold detectors having threshold levels set at values to be later described and operating such that they sense both direction of change and signal levels above the threshold level. The output of positive threshold detector 32 is coupled to a logical "AND" circuit 36 and the output of negative threshold detector 34 is coupled to a logical "AND" circuit 38. The output signals of "AND" circuits 36 and 38, respectively, represent the occurrence of the binary "0" and the binary "1" data bits and may be directed to other suitable apparatus, such as storage registers. The outputs from "AND" circuits 36 and 38 are also coupled to a logical "OR" circuit 40 which supplies an output pulse in response to an output signal from either of "AND" circuits 36 or 38.

The output of "OR" circuit 40 is connected directly to the "1" input of a flip-flop circuit 42 and to the "0" input of flip-flop 42 through a delay circuit 46. Delay circuit 46 provides a delay period of $(4N-1)T/4$. Thus, delay circuit 46 is designed to provide a delay of $7T/4$ if the two cycle per bit system is employed, $11T/4$ delay for the three cycle per bit system, etc. The "1" output of flip-flop 42 is connected to both "AND" circuits 36 and 38.

Figure 2:
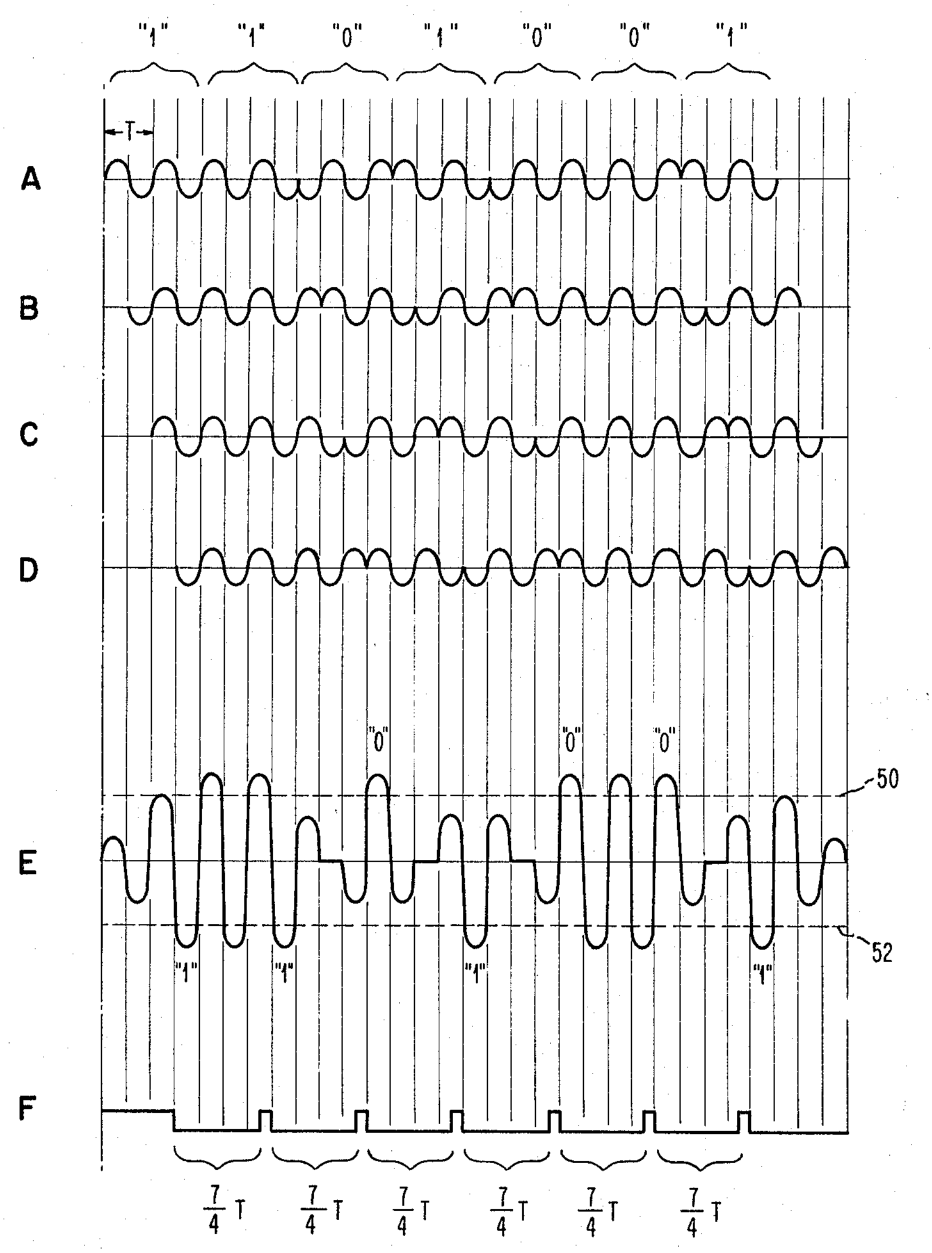
FIG. 2 is an illustration of waveforms useful in explaining the embodiment of FIG. 1.
Figure 3:
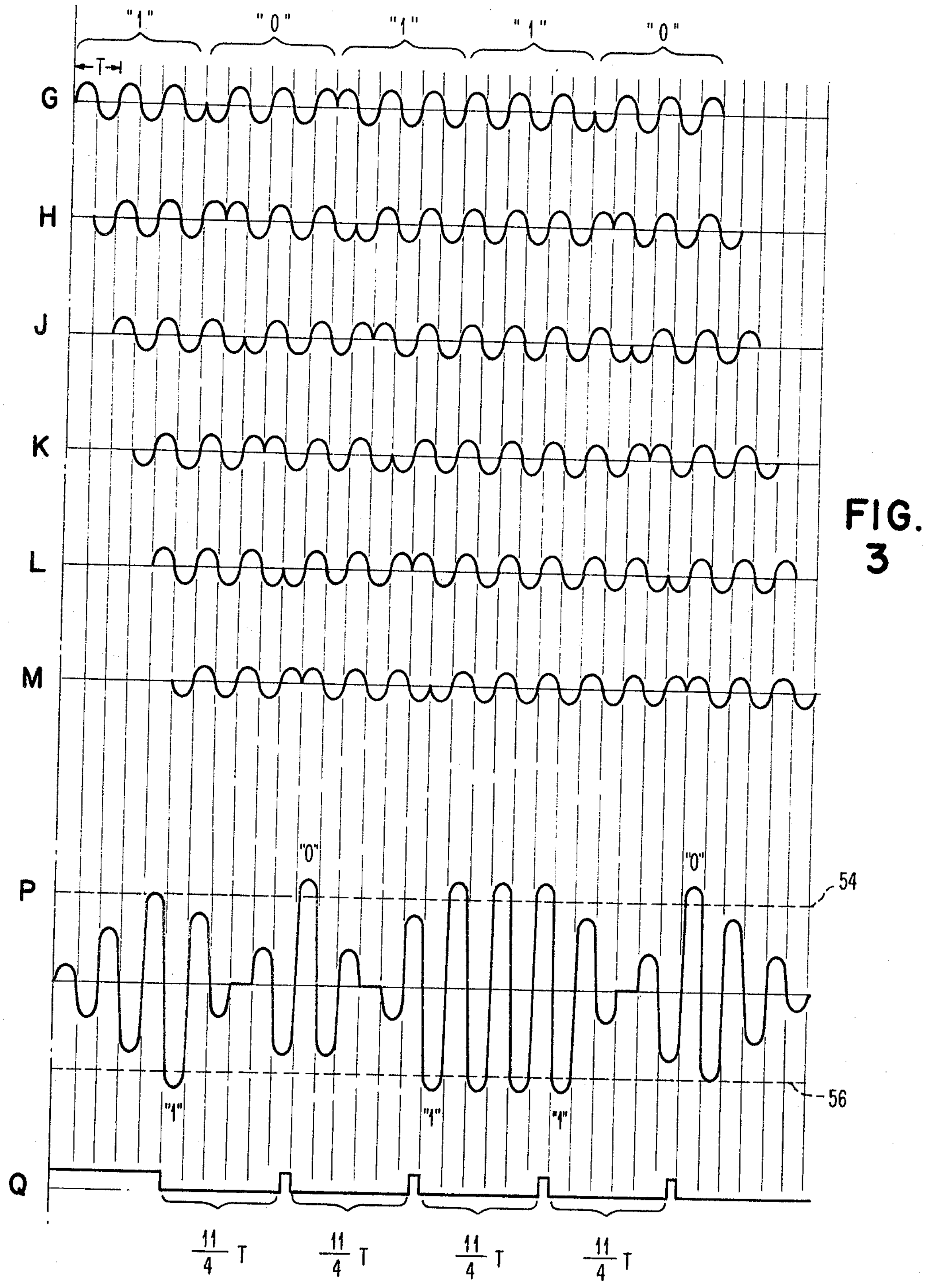
FIG. 3 is a further illustration of waveforms useful in explaining the embodiment of FIG. 1.

It was previously stated that the "1" and "0" data bits are represented by N cycles of received signal sinusoidal waveforms, with the polarity of the "1" bit waveforms being opposite to the polarity of the "0" bit waveforms. FIG. 2 illustrates the waveforms at various points of the apparatus of FIG. 1 when N is two, that is, when two cycles of waveform are employed to represent a "1" or "0" data bit. FIG. 3 is a similar illustration of the waveforms at various points of the apparatus of FIG. 1 when N is 3. In like manner it can be envisioned how N cycles of sinusoidal waveforms may represent each "1" and "0" data bits.

Referring to FIG. 2, waveform A represents one example of a train of received digits at the output of source of received signals 10 of FIG. 1. The digits represented are 1101001. It is noted that the two cycle sine wave representing a "1" bit has a polarity such that a positive excursion precedes a negative excursion in each cycle and that the two cycle waveform representing a "0" bit has a polarity such that a negative excursion precedes a positive excursion in each cycle. As previously mentioned, the period of a single cycle of the waveform is represented herein by the symbol T.

Waveform A, when delayed by an amount $T/2$ by delay circuit 14 and inverted by inverter circuit 16 of FIG. 1 appears as depicted by waveform B. Likewise the output of delay circuit 18 of FIG. 1 appears as waveform C and the output of inverter circuit 22 of FIG. 1 appears as waveform D. The number of cycles per bit in this example being 2, the total number of channels connected to linear adder 30 of FIG. 1 is 2N or four. Linear adder 30 provides an output equal to the sum of its inputs, such output being represented by waveform E of FIG. 2. From an examination of the waveform E, it is seen that the four waveforms A, B, C and D reinforce each other in certain halves of the waveform periods and oppose each other in others. For example, the peak amplitude of the waveform E in the second half of the second cycle is four times the amplitude of the output of source of received signals 10, shown at waveform A during the same half cycle. At the same time, the gaussian noise is equally likely to add or subtract, thereby improving the signal-to-noise ratio. It is to be further noted that each succeeding second half of each second cycle (i.e., each fourth half cycle) of waveform E is four times the magnitude of the corresponding half cycle of the output of source of received signal 10, shown at waveform A. Also, the fourth half cycles of waveform E are in a negative direction when the corresponding portion of waveform A represents a "1" bit and in a positive direction when the corresponding portion of waveform A represents a "0" bit.

Detection of the binary data manifested by the received signals (waveform A) from source 10 will be accomplished by sensing the polarity of each four half cycle of waveform E from linear adder 30. The detection apparatus will be de-gated during each first three half cycles of waveform E to prevent error. Error due to noise is also reduced since each fourth half cycle being sensed is always (in this example) four times the magnitude of the corresponding cycle of received signal and since the gaussian noise is equally likely to add or subtract, the overall signal-to-noise ratio is improved.

Referring again to FIG. 1, the output of linear adder 30 (as represented by waveform E, FIG. 2 in the example of the two cycle per bit received signal) is applied to the threshold detectors 32 and 34. Threshold detector 32 is responsive only to positive going polarity amplitudes exceeding its threshold. The threshold detectors 32 and 34 may be any appropriate well-known type, such as a vacuum tube or transistor amplifier biased to cut-off at any level below a selected threshold value and including a unidirectional element. Further, the threshold detectors 32 and 34 desirably contain controls for the cut-off levels, such as potentiometers connected across a suitable bias source and variable to change the threshold level. This is desirable since, although the maximum amplitude of waveform E of FIG. 2 is four times the maximum amplitude of waveform A for the two cycle per bit received signal, when the received signal is of the three cycle per bit type the maximum amplitude of waveform E will be six times the amplitude of waveform A, and so on, and the threshold detectors will require adjustment. The waveforms for the three cycle per bit mode will be later explained with reference to FIG. 3.

In FIG. 2, the positive and negative threshold levels, represented respectively by dotted lines 50 and 52 at waveform E, are shown as equal to three and one half times the peak amplitudes of the original waveform A received from source 10. It will be apparent that it is not essential that this particular threshold value be selected, and it may be found desirable to increase or decrease this value during operation of the apparatus, depending on the average amplitude of waveform A and the noise level in the received signal. In FIG. 1 the output of threshold detector 32 is connected to a logical "AND" circuit 36 and the output of threshold detector 34 is connected to a logical "AND" circuit 38. The output of "AND" circuit 36 represents the binary "0" and the output of "AND" circuit 38 represents the binary "1," the "0" and "1" output signals from "AND" circuits 36 and 38 may, as stated previously, be directed to suitable apparatus such as storage registers which are not shown. The output signals from "AND" circuits 36 and 38 are also supplied together to logical "OR" circuit 40 which provides a pulse whenever either threshold detector 32 or 34 supplies an output voltage during each fourth half cycle of the received signal (waveform A, FIG. 2). The restriction of this detection to each fourth half cycle of the received signal is achieved through use of an inhibition technique performed by a degating bistable flip-flop 42. The flip-flop 42 may be of any suitable well-known type such that its "1" output drops from a high level to a low level when a pulse is received by its "1" input, and its "1" output increases from the low level to a high level when its "0" input receives a pulse. The "1" input of the flip-flop 42 is supplied directly by "OR" circuit 40, while the "0" input is supplied by "OR" circuit 40 through a delay circuit 46 which provides a delay of $(4N-1)T/4$ as previously stated.

The "1" output signal of the flip-flop 42 is connected to both of the "AND" circuits 36 and 38 and functions to inhibit passage of the output of the respective threshold detectors 32 and 34 through the respective "AND" circuits 36 and 38 whenever the voltage at the "1" input of flip-flop 42 decreases below a selected level.

The waveform F of FIG. 2 represents the signal levels of the "1" output of flip-flop 42.

The operation of the system of FIG. 1 will now be described in reference to a two cycle per bit signal case as depicted in FIG. 2. Flip-flop 42 is initially in a condition such that its "1" output is at the high level and a gating signal is thereby present at "AND" circuits 36 and 38.

The incoming signal from source of received signals 10 will appear as waveform A (FIG. 2) and is directly applied to linear adder 30 via lead 12. The signal from source 10 is also passed through delay circuit 14 and inverter 16 and appears as waveform B (FIG. 2). Likewise, the signal from source 10 is transmitted through delay circuit 18 and appears as waveform C (FIG. 2) and through delay circuit 20 and inverter 22 and appears as waveform D (FIG. 2). The signals depicted by waveforms A, B, C and D (FIG. 2) are applied to linear adder 30 and result in an output therefrom as depicted by waveform E (FIG. 2). The output signal from linear adder 30 (waveform E, FIG. 2) is applied to threshold detectors 32 and 34. Threshold detector 32 produces an output signal in response to positive going signals above the given threshold level (dotted line 50 in FIG. 2) and threshold detector 34 produces an output signal in response to negative going signals exceeding the given threshold level (dotted line 52 in FIG. 2).

As the output signal from linear added 30 is applied to threshold detectors 32 and 34, the fourth half cycle of the signal, as it crosses threshold level 52, will produce an output signal from threshold detector 34 which is gated through "AND" circuit 38 causing a "1" bit indication to be stored in the register (not shown). The output signal from "AND" circuit 38 is also passed through "OR" circuit 40 and triggers flip-flop 42 such that the "1" bit output therefrom is switched to the low level (waveform F, FIG. 2) and "AND" circuits 36 and 38 are de-gated. The output signal from "OR" circuit 40 is also applied to delay circuit 46 where it is delayed for a period $$(4N-1)T/4$$

which in this instance is $7T/4$.

Thus, during the occurrence of the fifth and sixth half cycles of the signal from linear added 30 (waveform E), "AND" circuits 36 and 38 are de-gated so that even if the fifth and sixth half cycles may produce output signals from threshold detectors 32 and 34 (as is the case), no binary information will be transmitted to the storage registers.

During the seventh half cycle of signal from linear adder 30, the time period $7T/4$ has elapsed and the delayed signal from delay circuit 46 will switch flip-flop 42, raising the "1" output to the high level and applying a gating signal to "AND" gates 36 and 38. However, being that a $7T/4$ time period has elapsed since the fourth half cycle of the signal from linear adder 30 exceeded the threshold level of threshold device 34, the seventh half cycle of the signal will have passed its peak value and even if it exceeds the threshold level of threshold device 32, it is negative going and no output signal is produced thereby from threshold device 32.

As the negative going eighth half cycle exceeds threshold levels 52 (FIG. 2) of threshold device 34 which is gated through "AND" circuit 38. The output of "AND" circuit 38 is fed to the "1" bit storage register and through "OR" circuit 40 to switch flip-flop 42 such that the "1" bit output from flip-flop 42 transfers to the low level. Thus, "AND" circuits 36 and 38 are again de-gated. The output signal from "OR" circuit 40 is also applied to delay circuit 46 to be delayed for a $7T/4$ time period.

The "AND" circuits 36 and 38 being de-gated, the ninth, tenth and eleventh half cycles of the signal from linear adder 30 will not pass therethrough even if they are capable of passing threshold detectors 32 and 34. An output signal is provided from delay circuit 46 slightly after the occurrence of the peak value of the eleventh half cycle, thereby switching flip-flop circuit 42 such that the "1" bit output therefrom is raised to the high level and gating signals are thereby applied to "AND" circuit 36 and 38. When the twelfth half cycle of the signal from linear adder 30 exceeds threshold level 50 of threshold device 32, an output signal is produced therefrom which is gated through "AND" circuit 36, thereby applying a signal to the "0" bit storage register. The output signal from "AND" circuit 36 is also transmitted through "OR" circuit 40 to switch the output of flip-flop 42 to the low level, effectively de-gating "AND" circuits 36 and 38. The "AND" circuits 36 and 38 remain de-gated until the output from "OR" circuit 40, delayed $7T/4$ by delay circuit 46, again switches flip-flop 42. This occurs during the sixteenth half cycle of the signal from linear adder 30.

It can be seen that the circuit of FIG. 1 will continue to operate in this fashion, that is, the input signal from source 10, by proper delays and inversions, results in an output signal from linear adder 30 which (for the two cycle per bit example of FIG. 2) has a maximum value every fourth half cycle and the polarity of the fourth half cycles is representative of the binary coding of the input signal. The maximum fourth half cycles produce output signals from threshold circuits to provide the binary indications. In view of the fact that other half cycles of the signal from linear adder 30 are also capable of passing the threshold circuits, a degating circuit is provided such that the outputs from the threshold detectors are accepted only during the occurrence of the fourth half cycles. Each fourth half cycle of signal is four times the amplitude of the original received signal. Since the gaussian noise is equally likely to subtract as add, the overall signal-to-noise level is improved.

The operation of the system of FIG. 1 is similar in the case when the incoming coded signal is of the type wherein three cycles are employed to represent one bit. Waveform G of FIG. 3 is illustrative of the output signal of source 10 of FIG. 1 for the three cycles per bit case for the digits 10110. Waveform H represents the output of inverter circuit 16, waveform J represents the output of delay circuit 18, waveform K represents the output of inverter circuit 22, waveform L represents the output of delay circuit 24 (after a delay of 2T since N is 3) and waveform M represents the output of inverter circuit 28 after a delay of $5T/2$ by delay circuit 26. Waveform P represents the output signal from linear adder 30, which is the addition of waveform G, H, J, K, L and M. It is noted that in waveform P, every sixth half cycle is a maximum, being six times the amplitude of waveform G, with negative sixth half cycles being representative of "1" bits of the original signal (waveform G) and positive sixth half cycles being representative of "0" bits of the original signal.

In FIG. 1, threshold detector 32 is set at a threshold level represented by dotted line 54 in FIG. 3, and threshold detector 34 is set at a threshold level represented by dotted line 56 in FIG. 3, the threshold values being, for example, five times the amplitude of the original waveform G. In FIG. 1 it is desired that "AND" circuits 36 and 38 be gated only during the occurrence of the sixth half cycles of waveform P, therefore delay circuit 46 is adjusted to provide a delay of $(4N-1)T/4$ equal to $11T/4$. Thus, flip-flop 42 is originally in a condition such that the "1" bit output is at the high level and gating signals are applied to "AND" circuits 36 and 38. Upon the occurrence of the sixth half cycle the signal from linear adder 30 (waveform P), an output signal is produced by threshold detector 34 which is passed by "AND" circuit 38, and a "1" bit indication is entered in storage. The output signal from "AND" circuit 38 is also transmitted through "OR" circuit 40 to flip-flop 42 and delay circuit 46. Flip-flop 42 is switched and "AND" circuits 36 and 38 are de-gated for a period of $11T/4$ at which time an output signal from delay circuit 46 switches flip-flop 42 providing a gating signal to "AND" circuits 36 and 38. This is coincident with the occurrence of the twelfth half cycle of signal from linear adder 50 (waveform P, FIG. 3). In like manner the circuit of FIG. 1 will operate such that "AND" circuits 36 and 38 are gated only during the times when the eighteenth, twenty-fourth, and every succeeding sixth half cycle of waveform P is present. The "1" output level of flip-flop 42 is represented by waveform Q, FIG. 3.

Every sixth half cycle of signal is six times the amplitude of the original received signal, and the overall signal-to-noise ratio is improved. The three cycles per bit case will have better signal-to-noise properties than the two cycle per bit case, but is a slightly slower system. For very noisy environments, for example communication with satellites or rockets, it may be desirable to have a four cycle per bit or five cycle per bit system. In such case, the system would be as shown in FIG. 1 with the number of inputs to linear adder 30, the threshold level of threshold detector circuits 32 and 34, and the time delay of delay circuit 46 being determined by N, the number of cycles per bit.

While the invention has been particularly shown and described with reference to a preferred embodiment thereof, it will be understood by those skilled in the art that various changes in form and details may be made therein without departing from the spirit and scope of the invention.

What is claimed is:

1. A digital data communication system comprising means for producing binary coded signals including means for generating a first plurality of cycles of waveform having positive and negative excursions from a datum which occur in alternate half-waveform periods representative of a first binary digit and a second plurality of cycles of waveform opposite in polarity to said first plurality of cycles of waveform representative of a second binary digit, means coupled to said means for producing binary coded signals for adding the positive and negative excursions of each plurality of cycles of waveform together to provide, in a given single half waveform period, a combined excursion from said datum having a polarity dependent on the binary digit represented by each plurality of cycles of waveform, threshold means coupled to the output of said adding means and responsive to the signals therefrom to provide a first signal indicative of one binary digit when said combined excursions exceed a given threshold level in one polarity direction with respect to a datum and to provide a second signal indicative of another binary digit when said combined excursions exceed a given threshold level in the opposite polarity direction with respect to said datum, and means connected to said threshold means for inhibiting said threshold means for given time intervals between the occurrence of said indicative output signals.

2. A digital data communication system comprising means for generating binary digits in the form of N cycles of waveform where N is greater than one, each cycle of waveform having a positive and negative excursion from a datum which occur in alternate half waveform periods and wherein said positive excursions precede said negative excursions in said N cycles of waveforms representative of a first binary digit and said negative excursions precede said positive excursions in said N cycles of waveforms representative of a record binary digit, 2N channels coupled to said means for generating binary digits and responsive to said waveform signals, a first one of said 2N channels conducting said waveform signals unaffected, a second one of said channels including means for delaying said waveform signals for a one half waveform period, and each subsequent channel of said 2N channels including a means for delaying said waveform signals for a period of one half waveform more than the preceding channel, said second one of said 2N channels further including an inverter means for inverting the polarity of said delayed waveform signals therein, and every successive other one of said 2N channels also including an inverter means for inverting the polarity of said delayed waveform signals therein, means coupled to said 2N channels for adding the waveforms of the signals therefrom to produce a signal having a waveform wherein each 2N half waveform period thereof contains an excursion from said datum having a polarity representative of the type of digit represented by each 2N cycle of transmitted waveforms and each of said excursions in each 2N half waveform periods has an amplitude 2N times larger than the amplitude of said transmitted waveform, threshold means coupled to the output of said adding means and responsive to the signals therefrom to provide a first signal indicative of one binary digit when said excursions exceed a given threshold level in one polarity direction with respect to a datum and to provide a signal indicative of another binary digit when said combined excursions exceed a given threshold level in the opposite polarity direction with respect to a datum, and means connected to said threshold means for inhibiting said threshold means for given time intervals between said indicative output signals.

3. A system according to claim 2 wherein said inhibiting time period is $(4N-1)T/4$ where T is the period of a cycle of said plurality of cycles of waveform.

4. A system according to clam 2 wherein said threshold means includes a first threshold detector circuit for producing output signals in response to positive going signals which exceed a given positive threshold level and a second threshold detector circuit for producing output signals in response to negative going signals which exceed a given negative threshold level.

5. A system according to claim 4 wherein said inhibiting means includes a first inhibiting circuit connected to the output of said first threshold circuit, a second inhibiting circuit connected to the output of said second threshold circuit, and bistable means connected to said first and second inhibiting means, said bistable means controlling said first and second inhibiting means such that said first and second inhibiting means inhibits the output signals from said first and second threshold circuits when said bistable means is in a first state and said first and second inhibit means pass the output signals from said first and second threshold means when said bistable means is in a second state.

6. A system according according to claim 4 wherein said inhibiting means includes a first "AND" circuit connected to the output of said first threshold circuit, a second "AND" circuit coupled to the output of said second threshold circuit, an "OR" circuit connected to the outputs of said first and second "AND" circuits, a bistable flip-flop circuit having two input leads, one input lead being directly coupled to the output of said "OR" circuit, and an output lead connected to the inputs of said first and second "AND" circuits, and a delay circuit coupled between the other input lead of said bistable flip-flop and said "OR" circuit, said flip-flop circuit operating such that output signals from said first and second "AND" circuits coupled through said "OR" circuit to said one input lead thereof switches said flip-flop to inhibit said first and second "AND" circuit and said same output signals from said first and second "AND" circuits coupled through said "OR" circuit and said delay circuit to said other input lead of said flip-flop circuit switches said flip-flop to enable said first and second "AND" circuits.

7. A digital data communication system comprising means for generating "1" bits "0" bits, each "1" bit in the form of a plurality of cycles of waveform having positive excursions preceding negative excursions from a datum in half waveform periods thereof and each "0" bits in the form of a similar plurality of cycles of waveform having negative excursions preceding positive excursions from a datum in half waveform periods thereof, means coupled to said waveform generating means for demodulating said waveforms including means for adding said positive and negative excursions of each plurality of cycles of waveform to provide in a given single half waveform period, a combined excursion from said datum having a polarity dependent on the bit represented by each plurality of cycles of waveform, threshold means coupled to the output of said adding means and responsive to the signals therefrom to provide a first signal on one output lead indicative of a "0" bit when said combined excursions exceed a given threshold level in one polarity direction with respect to said datum and to provide a second signal on a second output lead indicative of a "1" bit when said combined excursions exceed a given threshold level in the opposite polarity direction with respect to said datum, and connected to said threshold means for inhibiting said indicative signals on said first and second output leads for given time intervals between the occurrence of said indicative signals.

8. A system according to claim 7 wherein said plurality of cycles of generated waveform is N cycles of waveform for each data bit, where N is an integer greater than one.

9. A system according to claim 8 wherein said adding means includes 2N parallel channels responsive to said transmitted waveform and an adding circuit coupled to each of said 2N channels, said first of said 2N channels coupling said transmitted waveform to said adding circuit unaffected, said second of said 2N channels delaying said transmitted waveform for a one half waveform period and inverting the polarity of said delayed waveform, and successive ones of said 2N channels delaying said transmitted waveform for a one half waveform period longer than the preceding channel and every successive other one of said 2N channels inverting the polarity of said delayed waveforms therein.

10. A system according to claim 9 wherein said indicating means includes a first threshold circuit coupled to the output of said adding circuit and responsive to the output signal therefrom to provide an output signal on an output lead when said combined excursions exceed a given threshold level in the positive direction with respect to said datum, and a second threshold circuit coupled to the output of said adding circuit and responsive to the output signal therefrom to provide an output signal on an output lead when said combined excursions exceed a given threshold level in the negative direction with respect to said datum.

11. A system according to claim 10 wherein said inhibiting means includes a first "AND" circuit connected to said output lead of said first threshold circuit, a second "AND" circuit connected to said output lead of said second threshold circuit, an "OR" circuit connected to the outputs of said first and second "AND" circuits, a bistable flip-flop circuit having two input leads, one input lead being directly coupled to the output of said "OR" circuit, and a delay circuit coupled between the other input lead of said flip-flop circuit and said "OR" circuit, said flip-flop circuit operating such that output signals from said first and second "AND" circuits coupled through said "OR" circuit to said one input lead thereof switches said flip-flop to inhibit said first and second "AND" circuits, and said same output signals from said first and second "AND" circuits coupled through said "OR" circuit and said delay circuit to said other input lead of said flip-flop circuit switches said flip-flop to enable said first and second "AND" circuits.

12. A system according to claim 11 wherein said delay period of said delay circuit is $(4N-1)T/4$ where T is the period of a cycle of said transmitted waveform.

References Cited by the Examiner

UNITED STATES PATENTS

| | | | |
|---|---|---|---|
| 2,446,077 | 7/1948 | Crosby | 178—66 |
| 2,779,833 | 1/1957 | Bradburd | 340—167 |
| 2,999,925 | 9/1961 | Thomas | 178—66 X |
| 3,037,079 | 5/1962 | Crafts | 178—66 X |
| 3,049,673 | 8/1962 | Barry | 340—170 X |
| 3,185,978 | 5/1965 | Edson | 340—170 X |

NEIL C. READ, *Primary Examiner.*

THOMAS B. HABECKER, *Examiner.*

P. XIARHOS, *Assistant Examiner.*